P. L. HOFFMAN.
DOOR HANGER.
APPLICATION FILED JULY 18, 1913.

1,090,306.

Patented Mar. 17, 1914.

Witnesses:
Wm Harold Eichelman
M. A. Milord

Inventor:
Peter L. Hoffman
by Frederick Benjamin
Attorney.

UNITED STATES PATENT OFFICE.

PETER L. HOFFMAN, OF AURORA, ILLINOIS, ASSIGNOR TO RICHARDS-WILCOX MANUFACTURING COMPANY, OF AURORA, ILLINOIS, A CORPORATION OF ILLINOIS.

DOOR-HANGER.

1,090,306.  Specification of Letters Patent.  Patented Mar. 17, 1914.

Application filed July 18, 1913. Serial No. 779,671.

*To all whom it may concern:*

Be it known that I, PETER L. HOFFMAN, citizen of the United States, residing at Aurora, in the county of Kane and State of Illinois, have invented certain new and useful Improvements in Door-Hangers, of which the following is a specification.

This invention relates to improvements in door-hangers of the trolley type, and the especial object of the improvements hereinafter described is to provide a laterally and vertically adjustable hanger of extremely simple, and therefore economical, construction, without impairing its strength or durability.

The following views illustrate my invention in its approved form:—

Figure 1:
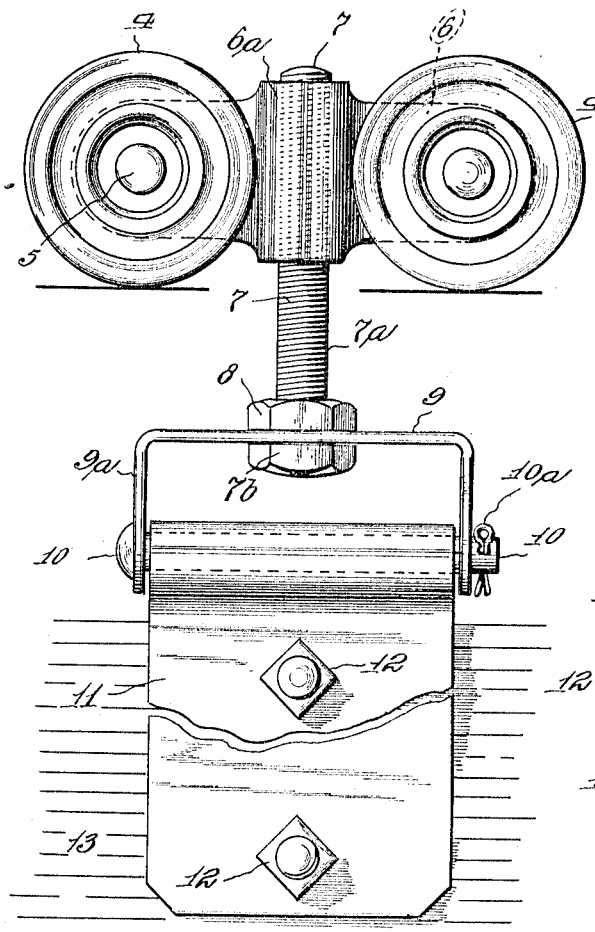
Figure 2:
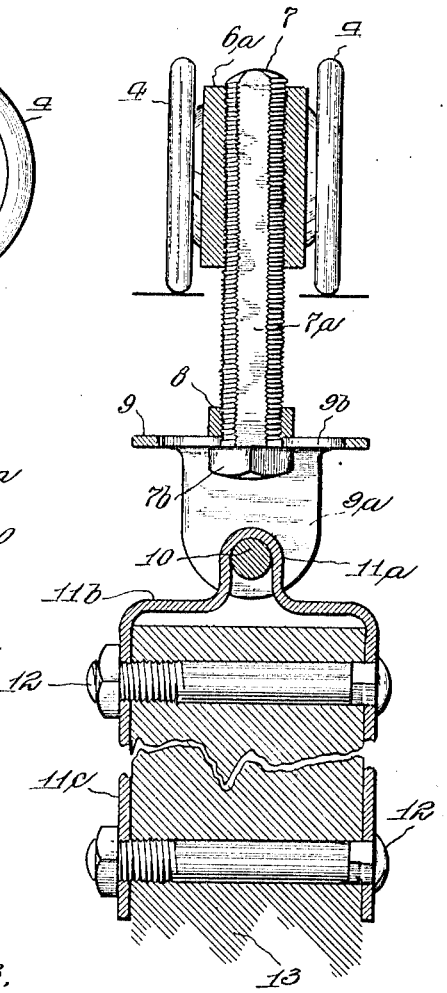
Figure 3:
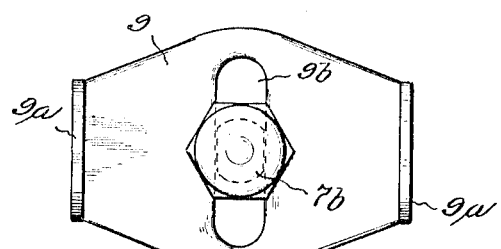

Figure 1 shows an elevation of the hanger complete; Fig. 2 is a vertical section on a line near the vertical axis of the hanger shown in Fig. 1; Fig. 3 is a plan view of the link which provides lateral adjustment for the hanger, the head of the connecting bolt being shown.

Referring to the details of the drawing, the reference numeral 4 represents the trolley wheels, of which there are two pairs mounted on axles 5, which have suitable bearings in the truck 6. This truck is preferably of cast metal in one piece, and is formed with a central enlarged portion 6ª which is provided with a vertical threaded bore to receive the bolt 7. This bolt is inserted in the truck with its head 7ᵇ downward, and on two of its sides the threads are cut away, and the bolt flattened throughout its length, as at 7ª. The bolt 7 is also provided with a lock-nut 8 which serves to clamp, and hold in adjusted position on the bolt, the link 9, which hangs pendant from the lower end of the bolt. The link 9 is formed from a piece of sheet metal cut to oval form, and the ends are bent at right angles to provide the ears 9ª. Transversely through the link, midway the ears, is a slot 9ᵇ which is just wide enough to receive the bolt with a sliding fit, when inserted with the flat sides 7ª parallel with the sides of the slot. Holes are provided in the ears 9ª, to receive the loose pin 10, which is held in place by the cotter-pin 10ª. The pin 10 serves to couple the link 9 to the apron 11, the latter being formed from a single piece of sheet metal bent to form the loop 11ª through which the pin extends, and bent outwardly at right angles from the loop, as at 11ᵇ, to provide the straps 11ᶜ which embrace the door 13, to which they are secured by the usual bolts 12, thus effecting a swinging connection between the pin and apron.

While I have shown and described the bolt 7 as mutilated or flattened on opposite sides and thus provide against the accidental turning of the bolt even though the clamping nut 8 should work loose, it is obvious that an ordinary standard bolt may be used for connecting the link with the truck.

The manner of adjusting the hanger is so obvious that explanation of same is superfluous.

Having thus described my invention what I claim as new and desire to secure by Letters Patent, is:—

1. In a door-hanger, the combination of a wheel-carrying truck having a vertical threaded opening midway its wheel axles, a bolt mounted in said opening with its head downward, a link having pendant ears, and a transverse slot slidably engaged by said bolt, a pin extending through said ears and removably held therein, and an apron swingingly connected with said pin.

2. In a door-hanger, the combination of a one-piece cast metal wheel-carrying truck having a vertical threaded opening midway its wheel-axles, a link having pendant ears, and a transverse slot, a bolt slidably and non-rotatably arranged in said slot and adjustable in said threaded opening in the truck, a lock nut on said bolt adapted with the bolt head to clamp said link, an apron having a loop therein, and a pin detachably engaging said ears and loop.

In testimony whereof I affix my signature in the presence of two witnesses.

PETER L. HOFFMAN.

Witnesses:
 MILTON D. JONES,
 WM. H. FITCH.

---

Copies of this patent may be obtained for five cents each, by addressing the "Commissioner of Patents, Washington, D. C."